United States Patent
Takahashi et al.

(10) Patent No.: US 12,429,647 B2
(45) Date of Patent: Sep. 30, 2025

(54) ILLUMINATION DEVICE AND DISPLAY DEVICE

(71) Applicant: Magnolia White Corporation, Tokyo (JP)

(72) Inventors: Yasuhiro Takahashi, Tokyo (JP); Shinichi Komura, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 0 days.

(21) Appl. No.: 18/419,586

(22) Filed: Jan. 23, 2024

(65) Prior Publication Data
US 2024/0255688 A1 Aug. 1, 2024

(30) Foreign Application Priority Data

Jan. 31, 2023 (JP) ................................ 2023-012888

(51) Int. Cl.
*F21V 8/00* (2006.01)
(52) U.S. Cl.
CPC ......... *G02B 6/0036* (2013.01); *G02B 6/0056* (2013.01); *G02B 6/0076* (2013.01); *G02B 6/0031* (2013.01)
(58) Field of Classification Search
CPC .. G02B 6/0036; G02B 6/0056; G02B 6/0076; G02B 6/0031
USPC ....................................... 362/606, 621, 622
See application file for complete search history.

(56) References Cited

U.S. PATENT DOCUMENTS

| | | | | |
|---|---|---|---|---|
| 7,021,812 B2 * | 4/2006 | Maeda | ................ | G02F 1/13362 362/610 |
| 7,645,048 B2 * | 1/2010 | Iwasaki | ................ | G02B 6/0073 362/614 |
| 7,740,387 B2 * | 6/2010 | Schultz | ................ | G02B 6/0055 362/330 |
| 11,796,730 B2 * | 10/2023 | Kijima | ................ | G02B 6/0036 |
| 2008/0204631 A1 * | 8/2008 | Takada | ................ | G02B 6/0068 313/111 |
| 2011/0187942 A1 * | 8/2011 | Cho | ................ | G02B 6/008 348/E5.133 |
| 2017/0139111 A1 * | 5/2017 | Komura | ................ | G02B 6/0055 |
| 2021/0041620 A1 * | 2/2021 | Kijima | ................ | G02B 6/0076 |
| 2023/0152630 A1 * | 5/2023 | Kijima | ................ | G02B 6/0076 362/97.1 |

FOREIGN PATENT DOCUMENTS

JP 2021-026905 A 2/2021

* cited by examiner

*Primary Examiner* — Laura K Tso
(74) *Attorney, Agent, or Firm* — XSENSUS LLP

(57) ABSTRACT

According to one embodiment, an illumination includes a first light guide including a first main surface, a second main surface, and a first side surface, a first light source applying a first linearly polarized light toward the first side surface, and a first retardation film provided on the first side surface and providing a phase difference to light emitted from the first light source. The first side surface is an inclined surface including a first end portion and a second end portion, and a distance between the second end portion and the first light source is smaller than a distance between the first end portion and the first light source.

16 Claims, 5 Drawing Sheets

ILLUMINATION DEVICE AND DISPLAY DEVICE

CROSS-REFERENCE TO RELATED APPLICATIONS

This application is based upon and claims the benefit of priority from Japanese Patent Application No. 2023-012888, filed Jan. 31, 2023, the entire contents of which are incorporated herein by reference.

FIELD

Embodiments described herein relate generally to an illumination device and a display device.

BACKGROUND

For example, a display device such as a liquid crystal display device comprises a display panel including pixels and an illumination device such as a backlight illuminating the display panel. The illumination device comprises a light source emitting light and a light guide toward which light is applied from the light source. The light emitted from the light source is made incident on the light guide from a side surface of the light guide, propagates inside the light guide, and is emitted from an emission surface corresponding to one of main surfaces of the light guide. For example, a configuration in which two light guides overlap with each other is known.

For example, a laser light source and the like are used as the light sources. In an area close to the light source, of the emission surface of the light guide, desired luminance cannot be obtained and non-uniformity in luminance may thereby occur. This non-uniformity in luminance can be a factor for the degradation in display quality of the display panel.

DETAILED DESCRIPTION

Figure 1:
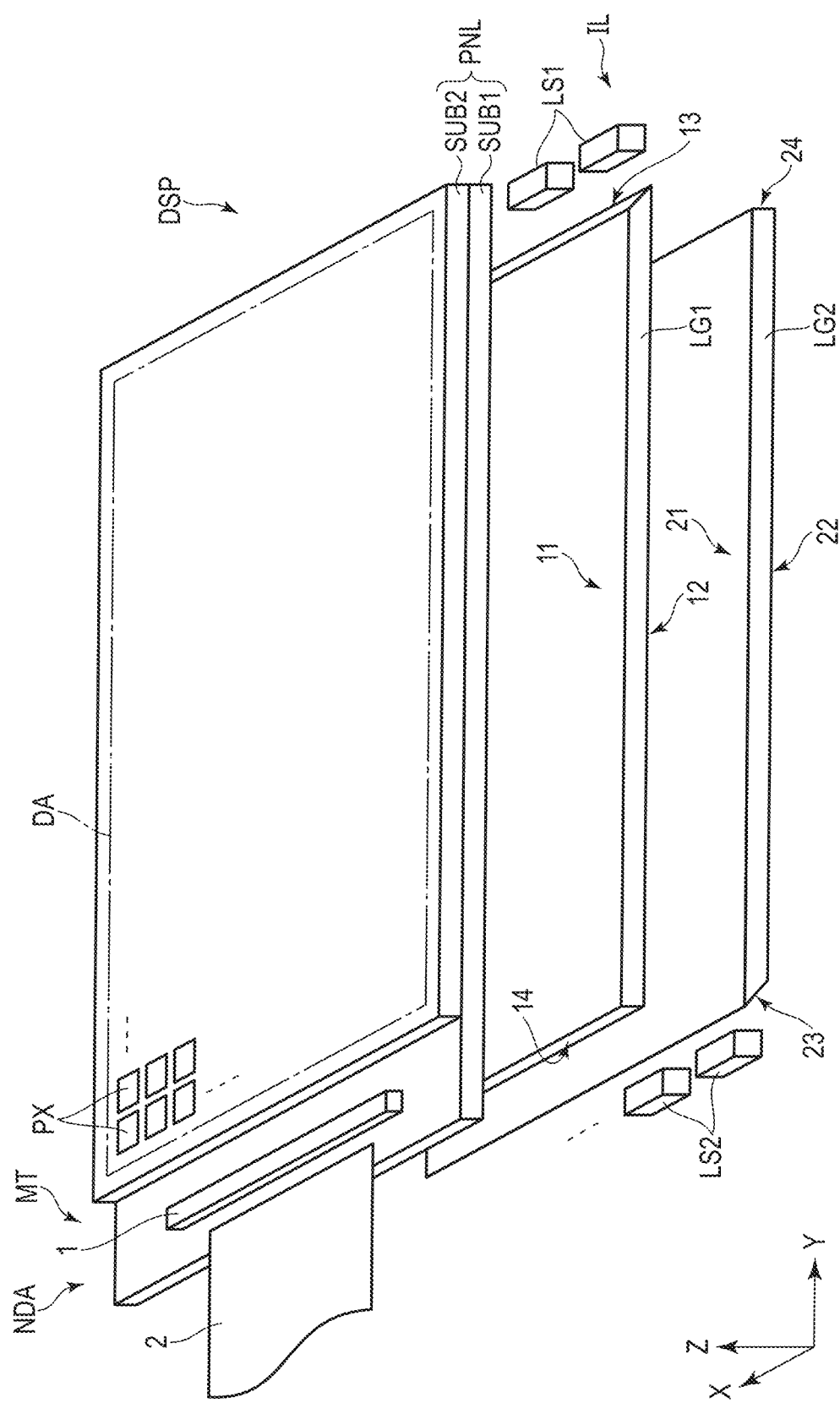
FIG. 1 is an exploded perspective view showing a configuration example of a display device according to a first embodiment.

In general, according to one embodiment, an illumination comprises a first light guide including a first main surface, a second main surface located on a side opposite to the first main surface, and a first side surface connecting the first main surface with the second main surface, a first light source applying a first linearly polarized light toward the first side surface, and a first retardation film provided on the first side surface and providing a phase difference to light emitted from the first light source. The first side surface is an inclined surface including a first end portion connected to the first main surface and a second end portion connected to the second main surface, and a distance between the second end portion and the first light source is smaller than a distance between the first end portion and the first light source.

According to another embodiment, a display device comprises the illumination device, a display panel overlapping with the illumination device, and a polarizer overlapping with the display panel.

According to these configurations, a display device and an illumination device capable of suppressing the degradation in display quality can be provided.

Embodiments will be described hereinafter with reference to the accompanying drawings.

The disclosure is presented for the sake of exemplification, and any modification and variation conceived within the scope and spirit of the invention by a person having ordinary skill in the art are naturally encompassed in the scope of invention of the present application. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. In addition, in the specification and drawings, structural elements which function in the same or a similar manner to those described in connection with preceding drawings are denoted by like reference numbers, detailed description thereof being omitted unless necessary.

In the figures, an X-axis, a Y-axis, and a Z-axis orthogonal to each other are described to facilitate understanding as needed. A direction along the X-axis is referred to as a first direction X, a direction along the Y-axis is referred to as a second direction Y, and a direction along the Z-axis is referred to as a third direction Z. The third direction Z is a normal to a plane including the first direction X and the second direction Y. In addition, viewing various elements parallel to the third direction Z is referred to as plan view.

In the present specification, the third direction Z is referred to as an upward direction (or, more simply, upwardly), and a direction opposite to the third direction Z is referred to as a downward direction (or, more simply, downwardly). According to "a second layer on/above a first layer" and "a second layer under/below a first layer", the second layer may be in contact with the first layer or may be separated from the first layer. An X-Y plane is defined by the first direction X and the second direction Y. An X-Z plane is defined by the first direction X and the third direction Z. A Y-Z plane is defined by the second direction Y and the third direction Z.

In the embodiments, a transmissive liquid crystal display device is disclosed as an example of the display device. In addition, an illumination device used as a backlight for the transmissive liquid crystal display device is disclosed as an example of the illumination device. The major configuration disclosed in the present embodiment can also be applied to a liquid crystal display device comprising a reflection-type function to reflect outside light and use the reflected light for displaying, in addition to a transmission-type function, an electronic paper-type display device including electrophoretic elements and the like, a display device to which MEMS (Micro Electro Mechanical System) is applied, a display device to which an electrochromism is applied, or the like. In addition, the major configuration disclosed in the present embodiment can be applied to illumination devices used in applications other than the backlight.

First Embodiment

FIG. 1 is an exploded perspective view showing a configuration example of a display device DSP according to the present embodiment. The display device DSP comprises a display panel PNL, an illumination device IL, an IC chip 1, and a wiring board 2.

The display panel PNL overlaps with the illumination device IL in the third direction Z. The display panel PNL comprises a first substrate SUB1 and a second substrate SUB2. The first substrate SUB1 is opposed to the second substrate SUB2. A display function layer (in the present embodiment, a liquid crystal layer to be described later) is provided between the first substrate SUB1 and the second substrate SUB2.

The display panel PNL includes a display area DA and a non-display area NDA surrounding the display area DA. The display area DA is an area in which images are displayed. The display area DA is located substantially in the center of an area in which the first substrate SUB1 and the second substrate SUB2 are opposed to each other. The non-display area NDA is an area in which no images are displayed. For example, the display panel PNL includes a plurality of pixels PX arrayed in a matrix in the display area DA.

The IC chip 1 and the wiring board 2 mainly function as signal sources which supply signals to the display panel PNL. The IC chip 1 and the wiring board 2 may read signals from the display panel PNL. The IC chip 1 and the wiring board 2 are located in the non-display area NDA.

The IC chip 1 and the wiring board 2 are, for example, mounted on a mounting portion MT of the first substrate SUB1. The mounting portion MT extends in the direction opposite to the second direction Y further than an end portion of the second substrate SUB2 in the second direction Y. The wiring board 2 is, for example, a flexible printed circuit which can be bent. The IC chip 1 may be mounted on the wiring board 2.

The illumination device IL emits light toward the display panel PNL. The illumination device IL comprises a light guide LG1, a light guide LG2, a plurality of light sources LS1, and a plurality of light sources LS2. In the present embodiment, the light guide LG1 corresponds to a first light guide, and the light guide LG2 corresponds to a second light guide.

In the present embodiment, the light source LS1 corresponds to a first light source, and the light source LS2 corresponds to a second light source. The light guide LG2, the light guide LG1, the first substrate SUB1, and the second substrate SUB2 are stacked in this order in the third direction Z. In the present embodiment, the third direction Z corresponds to the stack direction.

The light guides LG1 and LG2 are glass substrates or insulating substrates such as plastic substrates. The light guide LG1 is formed of a substrate formed of a material containing acrylic resin such as an acrylic substrate.

For example, the light guide LG2 is formed of the same material as the light guide LG1. Incidentally, the light guide LG2 may not be formed of the same material as the light guide LG1. The light guides LG1 and LG2 are formed in flat plate shapes parallel to the X-Y plane.

The light guide LG1 has main surfaces 11 and 12 and side surfaces 13 and 14. In the present embodiment, the main surface 11 corresponds to the first main surface, the main surface 12 corresponds to the second main surface, and the side surface 13 corresponds to the first side surface.

The main surface 11 is opposed to the display panel PNL. The main surface 11 functions as an emission surface of the illumination device IL. The main surface 12 is located on a side opposite to the main surface 11 in the third direction Z. The side surfaces 13 and 14 connect the main surface 11 with the main surface 12. The side surfaces 13 and 14 extend in the first direction X and are arranged in the second direction Y. The side surface 14 is located on a side opposite to the side surface 13 in the second direction Y.

For example, the main surfaces 11 and 12 are parallel to the X-Y plane and are parallel to each other. Incidentally, the main surfaces 11 and 12 may be non-parallel to each other. The side surface 13 is non-parallel to the X-Z plane. More specifically, the side surface 13 is an inclined surface. For example, the side surface 14 is parallel to the X-Z plane.

The light guide LG2 has main surfaces 21 and 22 and side surfaces 23 and 24. In the present embodiment, the main surface 21 corresponds to a third main surface, the main surface 22 corresponds to a fourth main surface, the side surface 23 corresponds to a second side surface, and the side surface 24 corresponds to a third side surface.

The main surface 21 is opposed to the main surface 12. The main surface 22 is located on a side opposite to the main surface 21 in the third direction Z. The side surfaces 23 and 24 connect the main surface 21 with the main surface 22. The side surfaces 23 and 24 extend in the first direction X and are arranged in the second direction Y. The side surface 24 is located on a side opposite to the side surface 23 in the second direction Y.

For example, the main surfaces 21 and 22 are parallel to the X-Y plane and are parallel to each other. Incidentally, the main surfaces 21 and 22 may be non-parallel to each other. The side surface 23 is non-parallel to the X-Z plane. More specifically, the side surface 23 is an inclined surface. For example, the side surface 24 is parallel to the X-Z plane.

The plurality of light sources LS1 apply light toward the side surface 13. The plurality of light sources LS1 are spaced apart from each other and arranged in the first direction X. In other words, the plurality of light sources LS1 are spaced apart from each other and arranged along the side surface 13.

The plurality of light sources LS2 apply light toward the side surface 23. The plurality of light sources LS2 are spaced apart from each other and arranged in the first direction X. In other words, the plurality of light sources LS2 are spaced apart from each other and arranged along the side surface 23.

The plurality of light sources LS2 are opposed to the plurality of light sources LS1 with the light guide LG1 and the light guide LG2 interposed therebetween in plan view. In other words, the plurality of light sources LS2 apply light toward the light guide LG2 from a direction opposite to the plurality of light sources LS1. The plurality of light sources LS1 and LS2 are, for example, laser light sources such as semiconductor lasers emitting polarized laser beams.

Figure 2:
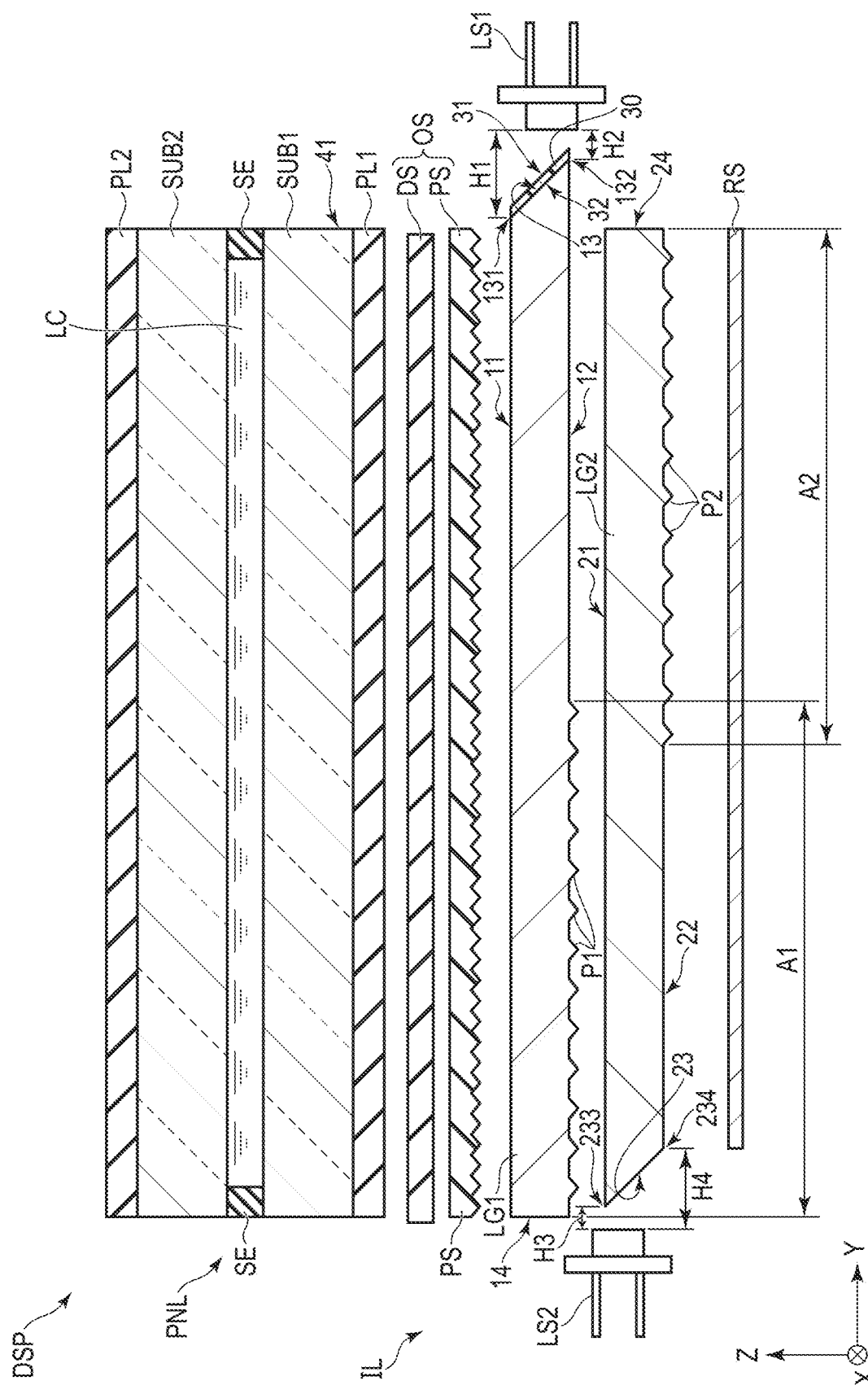
FIG. 2 is a cross-sectional view showing the display device shown in FIG. 1.

FIG. 2 is a cross-sectional view showing the display device DSP shown in FIG. 1. The display panel PNL further comprises a liquid crystal layer LC and a seal SE, as shown in FIG. 2. The liquid crystal layer LC and the seal SE are located between the first substrate SUB1 and the second substrate SUB2. The seal SE bonds the first substrate SUB1 with the second substrate SUB2 and also seals the liquid crystal layer LC between the first substrate SUB1 and the second substrate SUB2.

The display device DSP further comprises polarizers PL1 and PL2 and an optical sheet OS. The illumination device IL, the optical sheet OS, the polarizer PL1, the display panel PNL, and the polarizer PL2 are stacked in this order in the third direction Z.

The polarizers PL1 and PL2 overlap with the display panel PNL. The polarizer PL1 is bonded to the lower surface of the first substrate SUB1. The polarizer PL2 is bonded to the upper surface of the second substrate SUB2. For example, a polarization axis of the polarizer PL1 is orthogonal to a polarization axis of the polarizer PL2.

The optical sheet OS is located between the polarizer PL1 and the illumination device IL. The optical sheet OS includes a diffusion sheet DS and a prism sheet PS. The prism sheet PS and the diffusion sheet DS are stacked in this order in the third direction Z. In other words, the diffusion sheet DS is located between the polarizer PL1 and the prism sheet PS, and the prism sheet PS is located between the diffusion sheet DS and the illumination device IL.

The prism sheet PS condenses the light emitted from the main surface 11 of the light guide LG1 in the third direction Z, for example. The prism sheet PS includes a plurality of prisms continuously arranged in the second direction Y. The plurality of prisms of the prism sheet PS protrude toward the main surface 11 of the light guide LG1.

The cross-sectional shape parallel to the Y-Z plane of the prisms of the prism sheet PS is a triangle. The cross-sectional shape parallel to the Y-Z plane of each of the prisms included in the prism sheet PS is, for example, the same shape.

Incidentally, the plurality of (for example, two) prism sheets PS may be provided to overlap with each other in the third direction Z. The diffusion sheet DS diffuses the light made incident on the diffusion sheet DS and makes the luminance of the light uniform.

The illumination device IL comprises the light guide LG1, the light guide LG2, and the plurality of light sources LS1 and LS2, as described above. The light guide LG1 includes the side surface 13, which is an inclined surface, and the light guide LG2 includes the side surface 23, which is an inclined surface. In the example shown in FIG. 2, the light sources LS1 and LS2 are not inclined to the second direction Y.

The side surface 13 faces upward, and the side surface 23 faces downward. The side surface 13 includes a first end portion 131 connected to the main surface 11 and a second end portion 132 connected to the main surface 12. The first end portion 131 and the second end portion 132 extend in the first direction X.

The second end portion 132 protrudes in the second direction Y further than the first end portion 131. A distance H2 between the second end portion 132 and the light source LS1 is smaller than a distance H1 between the first end portion 131 and the light source LS1 (H2<H1), as shown in FIG. 2.

According to another viewpoint, the main surface 12 extends in the second direction Y further than the main surface 11. An angle formed between the side surface 13 and the main surface 12 is, for example, an acute angle. The angle formed between the side surface 13 and the main surface 12 is, for example, 26.9 degrees.

A distance between the side surface 13 and the light source LS1 is desirably small. In other words, since the side surface 13 is an inclined surface facing upward, the light source LS1 is preferably provided so as to make light incident on the side surface 13 from the vicinity of the second end portion 132.

The side surface 23 includes a third end portion 233 connected to the main surface 21 and a fourth end portion 234 connected to the main surface 22. The third end portion 233 and the fourth end portion 234 extend in the first direction X. The third end portion 233 protrudes in the direction opposite to the second direction Y further than the fourth end portion 234. A distance H3 between the third end portion 233 and the light source LS2 is smaller than a distance H4 between the fourth end portion 234 and the light source LS2 (H3<H4), as shown in FIG. 2.

From another viewpoint, the main surface 21 extends in the direction opposite to the second direction Y further than the main surface 22. An angle formed between the side surface 23 and the main surface 21 is, for example, an acute angle. The angle formed between the side surface 23 and the main surface 21 is, for example, 26.9 degrees.

A distance between the side surface 23 and the light source LS2 is desirably small. In other words, since the side surface 23 is an inclined surface facing downward, the light source LS2 is preferably provided so as to make light incident on the side surface 23 from the vicinity of the third end portion 233.

The main surface 12 includes a plurality of prisms P1 (first prisms). The plurality of prisms P1 emit light, emitted from the plurality of light sources LS1, from the main surface 11 toward the display panel PNL. The plurality of prisms P1 are formed in an area overlapping with the display panel PNL at least in plan view, and each of the plurality of prisms P1 extends in the first direction X.

A length of an area A1 in which the plurality of prisms P1 are formed in the second direction Y is longer than a length of an area in which the plurality of prisms P1 are not formed in the second direction Y, for example, in an area in which the light guides LG1 and LG2 overlap with the display panel PNL.

Although it has been described that the plurality of prisms P1 are formed in the area A1, the light guide LG1 is configured such that the light emitted from the plurality of light sources LS1 is reflected in the area in which the plurality of prisms P1 are not formed, and this light propagates inside the light guide LG1.

The main surface 22 includes a plurality of prisms P2 (second prisms). The plurality of prisms P2 emit the light, emitted from the plurality of light sources LS2, from the main surface 21 toward the display panel PNL. The plurality of prisms P2 are formed in the area overlapping with the display panel PNL at least in plan view, and each of the plurality of prisms P2 extends in the first direction X.

A length of an area A2 in which the plurality of prisms P2 are formed in the second direction Y is longer than a length of an area in which the plurality of prisms P2 are not formed in the second direction Y, for example, in the area in which the light guides LG1 and LG2 overlap with the display panel PNL.

The plurality of prisms P1 of the light guide LG1 overlap with the plurality of prisms P2 of the light guide LG2, for example. Incidentally, the plurality of prisms P1 of the light guide LG1 may not overlap with the plurality of prisms P2 of the light guide LG2.

Although it has been described that the plurality of prisms P2 are formed in the area A2, the light guide LG2 is configured such that the light emitted from the plurality of light sources LS2 is reflected in the area in which the plurality of prisms P2 are not formed and this light propagates inside the light guide LG2. Incidentally, the cross-sectional shapes parallel to the Y-Z plane of the prisms P1 and P2 are the same, for example, in the first direction X, but may be different from each other.

The plurality of prisms P1 and P2 are provided respectively. The plurality of prisms P1 and P2 may be provided in the same density or may be provided in densities different from each other. In addition, the plurality of prisms P1 may be formed on the main surface 11 of the light guide LG1, and the plurality of prisms P2 may be formed on the main surface 21 of the light guide LG2.

The illumination device IL further comprises a first retardation film 30 and a reflective sheet RS. The first retardation film 30 provides a phase difference to the light transmitted through the first retardation film 30. For example, the first retardation film 30 is a half-wave plate providing a phase difference of $\lambda/\lambda$ where the wavelength of the transmitted light is represented by $\lambda$. More specifically, the first retardation film 30 rotates the polarization direction of the transmitted light by 90 degrees. The first retardation film 30 is provided on the side surface 13.

The first retardation film 30 extends along the side surface 13. The first retardation film 30 has a surface 31 and a surface 32 located on a side opposite to the surface 31. The surface 31 faces upward. The plurality of light sources LS1 apply light toward the surface 31. In other words, the first retardation film 30 provides a phase difference to the light emitted from the light sources LS1.

The surface 32 is opposed to the side surface 13. The surface 32 is in close contact with the side surface 13. In other words, the first retardation film 30 is in close contact with the side surface 13. Therefore, a gap as an air layer is not formed between the surface 32 and the side surface 13. The first retardation film 30 is bonded to the side surface 13, for example, by an adhesive material.

The side surface 13 does not overlap with the side surface 24 of the light guide LG2 in the third direction Z. In other words, the side surface 13 protrudes in the second direction Y further than the side surface 24. More specifically, the first end portion 131 of the side surface 13 protrudes in the second direction Y further than the side surface 24. Therefore, the side surface 24 does not overlap with the first retardation film 30 in the third direction Z.

When the display panel PNL is focused, the display panel PNL does not overlap with the side surface 13 and the first retardation film 30 in the third direction Z. In other words, the side surface 13 protrudes in the second direction Y further than an end portion 41 of the display panel PNL. The end portion 41 is, for example, located on a side opposite to an end portion in the vicinity of the plurality of light sources LS2.

The first end portion 131 of the side surface 13 protrudes in the second direction Y further than the end portion 41 of the display panel PNL. When the polarizer PL1 and the optical sheet OS are focused, the polarizer PL1 and the optical sheet OS do not overlap with the side surface 13 and the first retardation film 30 in the third direction Z.

The reflective sheet RS is opposed to the main surface 22 of the light guide LG2. For example, the reflective sheet RS reflects the light leaked from the inside of the light guide LG2 and makes the light incident on the light guide LG2 again. For example, the reflective sheet RS overlaps with the side surface 24 of the light guide LG2 in the third direction Z. In other words, the reflective sheet RS does not overlap with the side surface 13 and the first retardation film 30 in the third direction Z.

Then, light propagation in the illumination device IL will be described.

Figure 3:
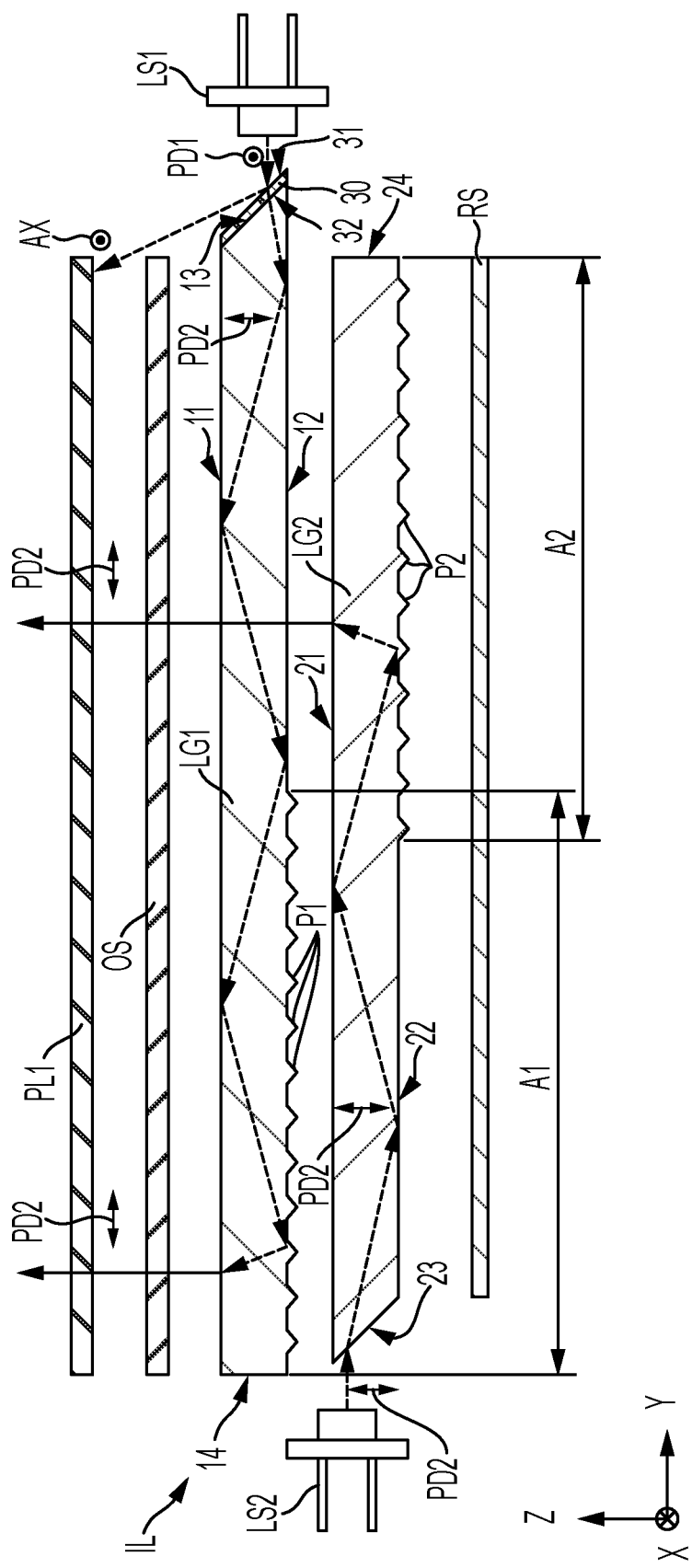
FIG. 3 is a view illustrating light propagation in an illumination device.

FIG. 3 is a view illustrating the light propagation in the illumination device IL. First, propagation of the light emitted from the plurality of light sources LS1 will be described.

The plurality of light sources LS1 apply light toward the side surface 13 through the first retardation film 30. The light emitted from the plurality of light sources LS1 is transmitted through the first retardation film 30 and is made incident on the light guide LG1 from the side surface 13. Since the first retardation film 30 is in close contact with the side surface 13 of the light guide LG1, the light transmitted through the first retardation film 30 is hardly reflected at the side surface 13.

The plurality of light sources LS1 emit first linearly polarized light. A polarization direction PD1 of the first linearly polarized light is, for example, parallel to the first direction X. When the light emitted from the plurality of light sources LS1 is transmitted through the first retardation film 30, the polarization direction of the light is rotated by 90 degrees.

The light whose polarization direction is rotated by 90 degrees from the first linearly polarized light is referred to as second linearly polarized light. The second linearly polarized light intersects the first linearly polarized light. A polarization direction of the second linearly polarized light is defined as a polarization direction PD2. In other words, the light transmitted through the first retardation film 30 is the second linearly polarized light.

The light transmitted through the first retardation film 30 is refracted at the side surface 13 and is made incident on the light guide LG1. The light traveling toward the main surface 12, of the light made incident on the light guide LG1, is reflected (for example, totally reflected) at an interface between the light guide LG1 and the air layer. The light traveling toward the main surface 11, of the light made incident on the light guide LG1, is reflected (for example, totally reflected) at the interface between the light guide LG1 and the air layer.

Thus, in an area in which the prism P1 is not provided, of the light guide LG1, light travels inside the light guide LG1 in the direction opposite to the second direction Y while being repeatedly reflected at the main surface 11 and the main surface 12.

The light traveling toward the prism P1, of the light travels inside the light guide LG1, is reflected at the prism P1 to change the direction of travel. The light reflected at the prism P1 does not satisfy the total reflection conditions at the main surface 11 and is emitted from the main surface 11.

The light emitted from the main surface 11 illuminates the display panel PNL through the optical sheet OS and the polarizer PL1. In other words, in the area in which the prism P1 is not provided, the light made incident from the side surface 13 is prevented from being emitted from the light guide LG1 toward the display panel PNL.

A part of the light emitted from the plurality of light sources LS1 is reflected at the surface 31 of the first retardation film 30 and travels toward the polarizer PL1. The light reflected at the first retardation film 30 travels mainly to an area in the vicinity of the light source LS1 of the polarizer PL1.

An absorption axis AX of the polarizer PL1 is parallel to the polarization direction of the first linearly polarized light in the example shown in FIG. 3. Therefore, the light reflected at the first retardation film 30 is absorbed into the polarizer PL1. In other words, the light reflected at the first retardation film 30 is not transmitted through the display panel PNL.

On the other hand, the light emitted from the main surface 11 of the light guide LG1 is the second linearly polarized light. In other words, the light emitted from the main surface 11 of the light guide LG1 can be transmitted through the polarizer PL1 and travel toward the first substrate SUB1.

Next, propagation of the light emitted from the plurality of light sources LS2 will be described. The plurality of light sources LS2 apply light toward the side surface 23. The light emitted from the plurality of light sources LS2 is made incident on the light guide LG2 from the side surface 23.

The light emitted from the plurality of light sources LS2 is refracted at the side surface 23 and is made incident on the light guide LG2. The light traveling toward the main surface 22, of the light made incident on the light guide LG2, is reflected (for example, totally reflected) at an interface between the light guide LG2 and the air layer. The light traveling toward the main surface 21, of the light made incident on the light guide LG2, is reflected (for example, totally reflected) at the interface between the light guide LG2 and the air layer.

Thus, in an area in which the prism P2 is not provided, of the light guide LG2, light travels inside the light guide LG2 in the second direction Y while being repeatedly reflected at the main surface 21 and the main surface 22.

The light traveling toward the prism P2, of the light traveling inside the light guide LG2, is reflected at the prism P2 to change the direction of travel. The light reflected at the prism P2 does not satisfy the total reflection condition of the main surface 21 and is emitted from the main surface 21.

The light emitted from the main surface 21 illuminates the display panel PNL through the light guide LG1, the optical sheet OS, and the polarizer PL1. In other words, in an area in which the prism P2 is not provided, the light made incident from the side surface 23 is prevented from being emitted from the light guide LG2 toward the display panel PNL.

The plurality of light sources LS2 apply the second linearly polarized light. In other words, the light emitted from the main surface 21 of the light guide LG2 is the second linearly polarized light. Therefore, the light emitted from the main surface 21 of the light guide LG2 can be transmitted through the polarizer PL1 and travel toward the first substrate SUB1.

Figure 4:
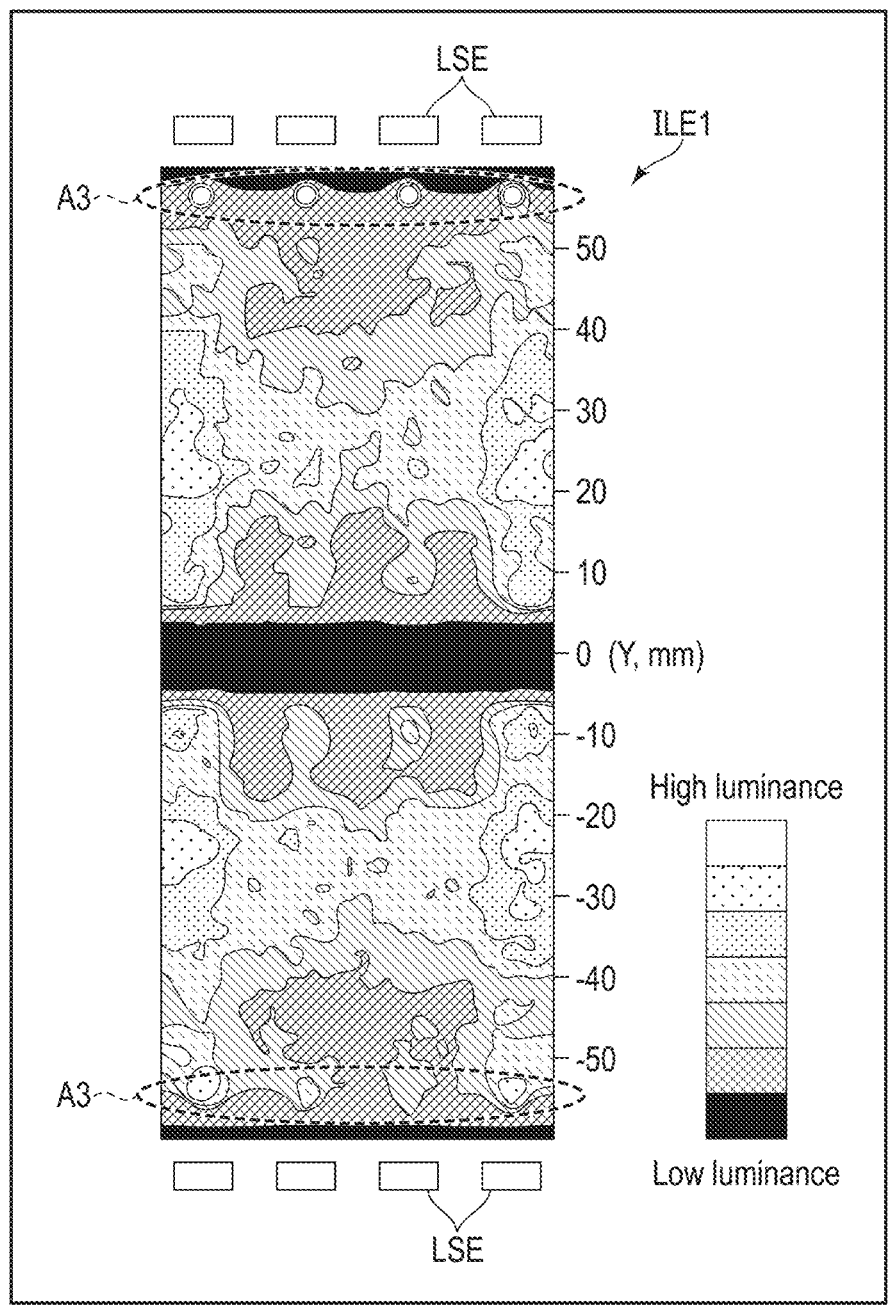
FIG. 4 is a view showing an example of luminance distribution.

FIG. 4 is a view showing an example of luminance distribution. In an illumination device ILE1 of the comparative example, a plurality of light sources LSE emit polarized laser beam. As shown in FIG. 4, in the illumination device ILE1, the non-uniformity in luminance (hot spots) may occur in an area A3 in the vicinity of the light source LSE. This non-uniformity in luminance can be a factor for the degradation in display quality.

The polarization direction of the light emitted from the plurality of light sources is assumed to be parallel to a transmission axis of the polarizer PL1. When the light emitted from the light source is reflected at a side surface such as the side surface 13 of the light guide LG1, the reflected light travels toward an area in the vicinity of the light source. This light is transmitted through the polarizer PL1 and travels toward the display panel PNL. Thus, the non-uniformity in luminance may occur in the area in the vicinity of the light source.

The illumination device IL of the present embodiment comprises the first retardation film 30 provided on the side surface 13. Thus, when the light emitted from the plurality of light sources LS1 is transmitted through the first retardation film 30, the polarization direction of the light is converted. In the present embodiment, the first retardation film 30 rotates the polarization direction by 90 degrees by providing the phase difference $\lambda/2$ to light.

As described with reference to FIG. 3, in a case where the light emitted from the light source LS1 is the first linearly polarized light, the light is converted to the second linearly polarized light when the light is transmitted through the first retardation film 30. The transmission axis of the polarizer PL1 is parallel to the polarization direction PD2 of the second linearly polarization light. Therefore, the light emitted from the main surface 11 of the light guide LG1 can be transmitted through the polarizer PL1 and travel toward the first substrate SUB1.

On the other hand, the absorption axis AX of the polarizer PL1 is parallel to the polarization direction PD1 of the first linearly polarized light. Since the side surface 13 is an inclined surface facing upward, the light reflected at the first retardation film 30 travels toward the polarizer PL1. Since the light reflected at the first retardation film 30 is absorbed into the polarizer PL1, the light is not transmitted through the display panel PNL.

For this reason, the illumination device IL of the present embodiment can suppress the occurrence of the non-uniformity in luminance in an area in the vicinity of the plurality of light sources LS1. As a result, the illumination device IL and the display device DSP of the present embodiment can suppress the degradation in display quality.

In the present embodiment, the first retardation film 30 is in close contact with the side surface 13. For this reason, reflection of the light transmitted through the first retardation film 30 at the side surface 13 is suppressed. As a result, the degradation in display quality due to the light reflected at the side surface 13 is suppressed.

In the light guide LG1 of the present embodiment, the light traveling inside the light guide LG1 is hardly made incident on the display panel PNL, in the area in which the prism P1 is not formed. On the other hand, the area A1 is spaced apart from the side surface 13 by a distance sufficient for the light emitted from the light source LS1 to mix with each other. Therefore, the degradation in display quality caused by the non-uniformity in luminance and the like due to the light emitted from the light guide LG1 can be suppressed.

In the present embodiment, the illumination device IL further comprises the light guide LG2 and the light source LS2. The light source LS2 is opposed to the light source LS1 with the light guide LG1 and the light guide LG2 interposed therebetween in plan view.

In the light guide LG1 of the present embodiment, the light traveling inside the light guide LG2 is hardly made incident on the display panel PNL, in the area in which the prism P2 is not formed. On the other hand, the area A2 is spaced apart from the side surface 23 by a distance sufficient for the light emitted from the light source LS2 to mix with each other. Therefore, the degradation in display quality caused by the non-uniformity in luminance and the like due to the light emitted from the light guide LG2 can be suppressed.

The light applied from light source LS2 is emitted in the vicinity of the side surface 13, on which the light source LS1 is provided, and the light applied from the light source LS1 is emitted in the vicinity of the side surface 23, on which the light source LS2 is provided. As a result, in the present embodiment, the non-uniformity in luminance caused by the light emitted from the illumination device IL toward the display panel PNL hardly occurs.

The prisms P1 and P2 include areas overlapping with each other in the third direction Z. Therefore, the decrease in the luminance level of the light emitted from the illumination device IL in the central part in the second direction Y (central part in the display area DA of the display panel PNL) can be suppressed.

The side surface 23 of the light guide LG2 of the present embodiment is an inclined surface facing downward. When the side surface 23 is an inclined surface facing upward, the light source LS2 needs to be provided lower to make the distance between the side surface 23 and the light source LS2 smaller. This leads to an increase in a thickness of the illumination device IL.

Since the side surface 23 of the light guide LG2 in the present embodiment faces downward, the distance between the side surface 23 and the light source LS2 can be made smaller by moving the light source LS2 upward. Thus, the increase in the thickness of the illumination device IL can be suppressed. In other words, the illumination device IL can be made thinner in the present embodiment.

The side surface 13 of the light guide LG1 and the first retardation film 30 do not overlap with the first polarizer PL1, the display panel PNL, and the side surface 24 of the light guide LG2. When the light emitted from the main surface 21 of the light guide LG2 is transmitted through the first retardation film 30, the light is converted from the second linearly polarized light to the first linearly polarized light. Therefore, the light emitted from the main surface 21 of the light guide LG2 may be absorbed into the polarizer PL1.

In the present embodiment, since the side surface 13 of the light guide LG1 and the first retardation film 30 do not overlap with the polarizer PL1 and the side surface 24 of the light guide LG2, the light emitted from the main surface 21 of the light guide LG2 is prevented from being transmitted through the first retardation film 30. Thus, the utilization efficiency of the light emitted from the main surface 21 of the light guide LG2 can be improved.

As described above, according to the configuration of the present embodiment, the illumination device IL and the display device DSP that can suppress the degradation in display quality can be provided. Besides this, various other favorable effects can be obtained from the present embodiment.

In the present embodiment, the example in which the retardation film is not provided on the side surface 23 of the light guide LG2 is described. However, when the plurality of the light sources LS2 emit the first linearly polarized light, a retardation film corresponding to the first retardation film 30 may be provided on the side surface 23 of the light guide LG2.

In the present embodiment, the example in which the display device DSP comprises the polarizers PL1 and PL2 is described. However, the display device DSP may not comprise the polarizer PL1. In this case, the display device DSP is configured such that the light reflected at the first retardation film 30 is absorbed into the polarizer PL21.

Optical elements such as lenses may be further arranged between the plurality of light sources LS1 and the side surface 13, and between the plurality of light sources LS2 and the side surface 23, and a width or angle of the light emitted from the plurality of light sources LS1 and LS2 may be thereby adjusted.

Second Embodiment

The second embodiment will be described. As regards constituent elements of a display device DSP which are not particularly described, of the present embodiment, the same elements as the first embodiment can be applied. The present embodiment is different from the first embodiment in that an illumination device IL comprises second retardation films 51 and 52.

Figure 5:
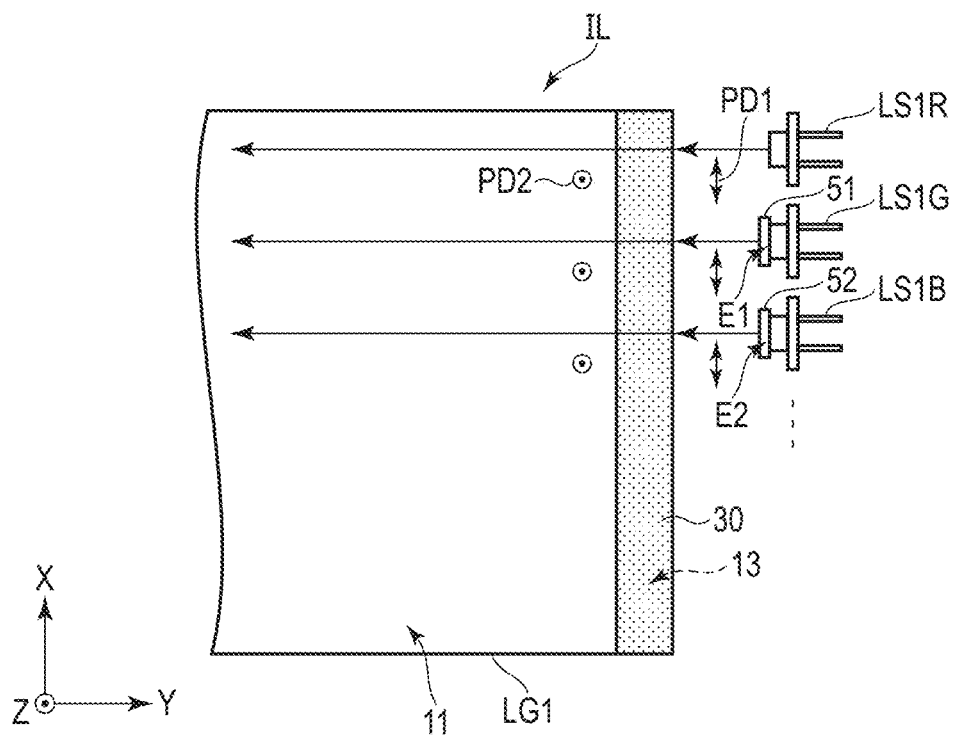
FIG. 5 is a schematic partial plan view showing an illumination device according to a second embodiment.
Figure 6:
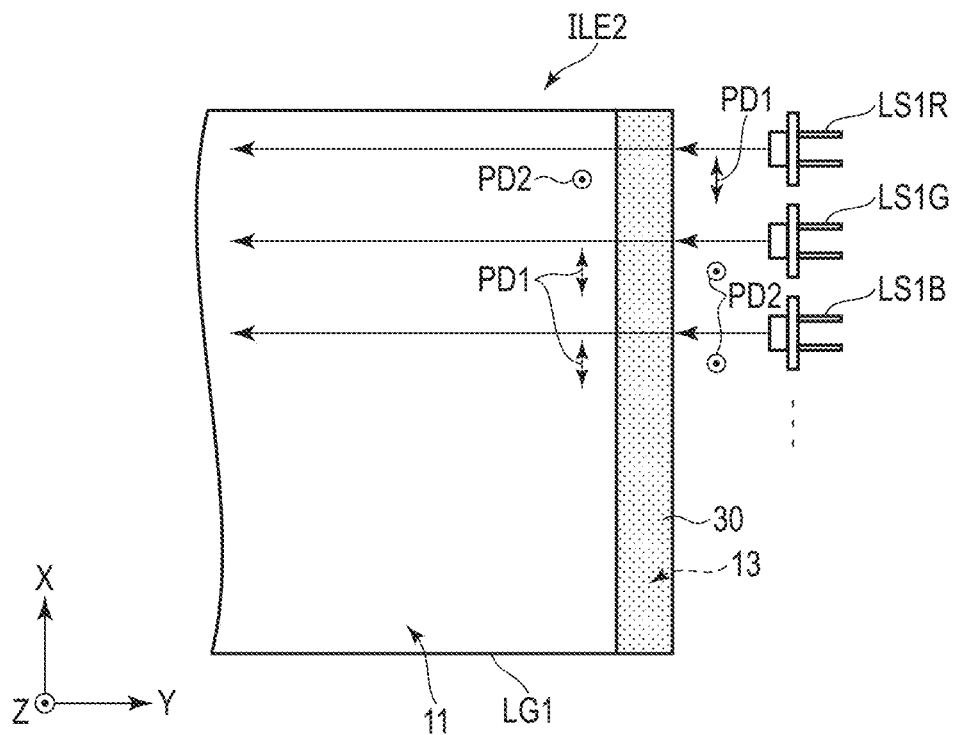
FIG. 6 is a schematic partial plan view showing an illumination device according to a comparative example.

FIG. 5 is a schematic partial plan view showing the illumination device IL of the present embodiment. FIG. 6 is a schematic partial plan view showing an illumination device ILE2 of a comparative example. The illumination device IL comprises the plurality of light sources and the second retardation films 51 and 52.

The plurality of light sources apply light toward a side surface 13 of a light guide LG1. The plurality of light sources comprise a light source LS1R emitting first linearly polarized light and light sources LS1G and LS1B emitting second linearly polarized light.

In the present embodiment, the light source LS1R corresponds to a first light source, the light source LS1G corresponds to a third light source, and the light source LS1B corresponds to a fourth light source. The plurality of light sources are, for example, arranged along the side surface 13 in the order of the light source LS1R, the light source LS1G, and the light source LS1B.

The light sources LS1R, LS1G, and LS1B emit light of wavelengths different from each other. For example, the light source LS1G emits the light of a wavelength shorter than that of the light source LS1R, and the light source LS1B emits the light of a wavelength shorter than that of the light source LS1G. In other words, the light source LS1R emits the red light, the light source LS1G emits the green light, and the light source LS1B emits the blue light.

In the second direction Y, the second retardation film 51 is located between a first retardation film 30 and the light source LS1G, and the second retardation film 52 is located between the first retardation film 30 and the light source LS1B. In the example shown in FIG. 5, the second retardation film 51 is in close contact with a light emitting surface E1 of the light source LS1G, and the second retardation film 52 is in close contact with a light emitting surface E2 of the light source LS1B. As another example, the second retardation films 51 and 52 may not be in close contact with the light sources LS1G and LS1B.

As shown in FIG. 6, the illumination device ILE2 of the comparative example does not comprise the second retardation films 51 and 52. The polarization direction of the light emitted from the light sources LS1R, LS1G, and LS1B is converted when the light is transmitted through the first retardation film 30.

More specifically, since the light source LS1R emits the first linearly polarized light, the light is converted to the second linearly polarized light when transmitted through the first retardation film 30. Since the light sources LS1G and LS1B emit the second linearly polarized light, the light is converted to the first linearly polarized light when transmitted through the first retardation film 30.

Therefore, the light emitted from the light source LS1R propagates inside the light guide LG1 as the second linearly polarized light, and the light emitted from the light sources LS1G and LS1B propagates inside the light guide LG1 as the first linearly polarized light.

A polarizer PL1 including an absorption axis parallel to the polarization direction of the first linearly polarized light is provided between the illumination device IL and a display panel PNL. When the light propagating inside the light guide LG1 is emitted from the main surface 11, the light emitted from the light source LS1R is transmitted through the polarizer PL1 and travels toward the display panel PNL, but the light emitted from the light sources LS1G and LS1B is absorbed into the polarizer PL1. In the illumination device ILE2 of the comparative example, the light emitted from the light sources LS1G and LS1B cannot be sufficiently utilized, and the degradation in display quality may thereby occur.

The illumination device IL of the present embodiment comprises the second retardation films 51 and 52. The second retardation film 51 is located between the first retardation film 30 and the light source LS1G, and the second retardation film 52 is located between the first retardation film 30 and the light source LS1B.

The light emitted from the light sources LS1G and LS1B is transmitted through the second retardation films 51 and 52 before being transmitted through the first retardation film 30. Since the light sources LS1G and LS1B emit the second linearly polarized light, the light is converted to the first linearly polarized light when transmitted through the second retardation films 51 and 52.

Next, the light transmitted through the second retardation films 51 and 52 is converted from the first linearly polarized light to the second linearly polarized light when transmitted through the first retardation film 30. In other words, the light emitted from the light sources LS1G and LS1B propagate inside the light guide LG1 as the second linearly polarized light in the same way as the light emitted from the light source LS1R.

Therefore, when the light propagating inside the light guide LG1 is emitted from the main surface 11, this light can be transmitted through the polarizer PL1 and travel toward the display panel PNL. Thus, even when the plurality of light sources comprise the light source LS1R emitting the first linearly polarized light and the light sources LS1G and LS1B emitting the second linearly polarized light, the light emitted from the light sources LS1R, LS1G, and LS1B can be used as the light to be applied toward the display panel PNL.

As a result, according to the configuration of the present embodiment, the illumination device IL and the display device DSP capable of suppressing the degradation in display quality can be provided. In the present embodiment as well, an advantageous effect similar to that of the first embodiment can be obtained.

All of the display devices and the illumination devices that can be implemented by a person of ordinary skill in the art through arbitrary design changes to the display devices and the illumination devices described above as embodiments of the present invention come within the scope of the present invention as long as they are in keeping with the spirit of the present invention.

Various modified examples which may be conceived by a person of ordinary skill in the art in the scope of the idea of the present invention will also fall within the scope of the invention. For example, the above embodiments with addition, deletion, and/or designed change of their structural elements by a person having ordinary skill in the art, or the above embodiments with addition, omission, and/or condition change of their processes by a person having ordinary skill in the art are encompassed by the scope of the present inventions without departing the spirit of the inventions.

In addition, the other advantages of the aspects described in the embodiments, which are obvious from the descriptions of the present specification or which can be arbitrarily conceived by a person of ordinary skill in the art, are considered to be achievable by the present invention as a matter of course.

What is claimed is:

1. An illumination device, comprising:
a first light guide including a first main surface, a second main surface located on a side opposite to the first main surface, and a first side surface connecting the first main surface with the second main surface;
a first light source applying first linearly polarized light toward the first side surface; and
a first retardation film provided on the first side surface and providing a phase difference to light emitted from the first light source;
a second light guide including a third main surface opposed to the second main surface, a fourth main surface located on a side opposite to the third main surface, and a second side surface connecting the third main surface with the fourth main surface; and
a second light source applying second linearly polarized light intersecting the first linearly polarized light toward the second side surface, wherein
the first side surface is an inclined surface including a first end portion connected to the first main surface and a second end portion connected to the second main surface, and
a distance between the second end portion and the first light source is smaller than a distance between the first end portion and the first light source,
the second light source is opposed to the first light source with the first light guide and the second light guide interposed therebetween in plan view,
the second light guide further includes a third side surface located on a side opposite to the second side surface, and
the third side surface does not overlap with the first retardation film in a stack direction in which the first light guide and the second light guide are stacked.

2. The illumination device of claim 1, wherein
the first retardation film is in close contact with the first side surface.

3. The illumination device of claim 1, wherein
the first retardation film provides a phase difference of $\lambda/2$ to the light emitted from the first light source.

4. The illumination device of claim 1, wherein
the second side surface is an inclined surface including a third end portion connected to the third main surface and a fourth end portion connected to the fourth main surface, and
a distance between the third end portion and the second light source is smaller than a distance between the fourth end portion and the second light source.

5. The illumination device of claim 4, wherein
the second main surface includes a plurality of first prisms located on a position spaced apart from the first side surface.

6. The illumination device of claim 5, wherein
the fourth main surface includes a plurality of second prisms located on a position spaced apart from the second side surface.

7. The illumination device of claim 1, further comprising:
a reflective sheet opposed to the fourth main surface.

8. The illumination device of claim 7, wherein
the reflective sheet does not overlap with the first retardation film in a stack direction in which the first light guide and the second light guide are stacked.

9. The illumination device of claim 1, further comprising:
a third light source applying second linearly polarized light intersecting the first linearly polarized light toward the first side surface;
a fourth light source applying the second linearly polarized light toward the first side surface; and
a second retardation film, wherein
the first light source, the third light source, and the fourth light source are arranged along the first side surface,
a wavelength of light emitted from the third light source is different from a wavelength of the light emitted from the first light source,
a wavelength of light emitted from the fourth light source is different from the wavelength of the light emitted from the first light source and the third light source, and the second retardation film is located between the first retardation film and the third light source, and between the first retardation film and the fourth light source respectively.

10. The illumination device of claim 9, wherein the second retardation film is in close contact with a light emitting surface of the third light source and a light emitting surface of the fourth light source.

11. A display device, comprising:
the illumination device of claim 1;
a display panel overlapping with the illumination device; and
a polarizer overlapping with the display panel.

12. The display device of claim 11, wherein an absorption axis of the polarizer is parallel to a polarization direction of the first linearly polarized light.

13. The illumination device of claim 11, further comprising:
an optical sheet between the polarizer and the illumination device.

14. The display device of claim 11, wherein the optical sheet includes a prism sheet and a diffusion sheet located between the polarizer and the prism sheet.

15. The display device of claim 11, wherein the polarizer does not overlap with the first retardation film in a stack direction in which the first light guide and the display panel are stacked.

16. The display device of claim 13, wherein the optical sheet does not overlap with the first retardation film in a stack direction in which the first light guide and the display panel are stacked.

* * * * *